United States Patent [19]

Ladouceur et al.

[11] Patent Number: 5,441,417
[45] Date of Patent: Aug. 15, 1995

[54] ELECTRICAL GROUNDING STUD

[75] Inventors: Harold A. Ladouceur, Livonia, Mich.; Rudolf R. M. Muller, Frankfurt, Germany

[73] Assignee: Multifastener Corporation, Detroit, Mich.

[21] Appl. No.: 988,066

[22] Filed: Dec. 9, 1992

Related U.S. Application Data

[60] Continuation-in-part of Ser. No. 786,243, Oct. 31, 1991, Pat. No. 5,207,588, which is a continuation-in-part of Ser. No. 491,925, Mar. 12, 1990, Pat. No. 5,092,724, which is a division of Ser. No. 196,209, May 19, 1988, Pat. No. 4,915,558, which is a division of Ser. No. 892,017, Aug. 1, 1986, Pat. No. 4,765,057, which is a division of Ser. No. 773,387, Sep. 6, 1985, Pat. No. 4,633,560, which is a division of Ser. No. 563,833, Dec. 21, 1983, Pat. No. 4,555,838, which is a continuation-in-part of Ser. No. 485,099, Mar. 28, 1983, Pat. No. 4,459,073, and a continuation-in-part of Ser. No. 504,074, Jun. 14, 1983, Pat. No. 4,543,701, Ser. No. 485,099, Jun. 14, 1983, which is a division of Ser. No. 229,274, Jan. 28, 1981, abandoned, Ser. No. 504,074, Jan. 28, 1981, which is a continuation of Ser. No. 229,274, Jan. 28, 1981.

[51] Int. Cl.⁶ .......................... H01R 4/06; H01R 4/26
[52] U.S. Cl. .......................... 439/84; 439/92; 439/387; 411/181; 411/188; 411/959; 411/436
[58] Field of Search ............ 411/284, 186, 386, 436; 439/801, 84, 92, 387, 870

[56] References Cited

U.S. PATENT DOCUMENTS

| | | | |
|---|---|---|---|
| 1,976,019 | 10/1934 | Heim | 29/898.063 |
| 2,456,118 | 12/1948 | Foster | 174/153 R |
| 2,521,505 | 9/1950 | Doyle | 29/524.1 |
| 3,056,443 | 10/1962 | Knocke | 411/186 |
| 3,299,500 | 1/1967 | Double | 29/432.2 |
| 3,314,138 | 4/1967 | Double | 29/432.2 |

FOREIGN PATENT DOCUMENTS

| | | | |
|---|---|---|---|
| 539594 | 9/1941 | Australia | . |
| 763619 | 9/1980 | U.S.S.R. | 411/186 |

*Primary Examiner*—Gary F. Paumen
*Attorney, Agent, or Firm*—Howard & Howard

[57] ABSTRACT

An electrical grounding connector, electrical grounding connector assembly, and a method of attaching an electrical grounding connector and electrical grounding connector assembly to an electrically conductive panel is disclosed. The grounding connector assembly includes a grounding stud connector having a body portion disposed between, and integrally joining, a stud portion and a riveting portion. The body portion includes a flange extending generally radially from the body portion and the flange includes a panel engaging surface and a lug engaging surface. A protective nut is adapted to engage and substantially cover the stud portion of the grounding stud connector thereby protecting the stud portion from contaminants. Barbed elements are disclosed on various surfaces of the grounding connector thereby giving the grounding connector excellent electrically conductive properties when it is assembled to an electrically conductive panel. In a preferred embodiment, the grounding connector is preassembled with the protective nut, thereby allowing the assembly to be installed on an electrically conductive panel in one step. In another preferred embodiment, the opposed surfaces of the stud flange and nut converge to provide a line contact adjacent the radial outer edge of the flange, eliminating the requirement for barbs on the flange. This embodiment further includes a nut having an open end, such that the free end of the stud is exposed and providing a bearing surface on the nut which is not connected directly to the stud. While the grounding connector and connector assembly is particularly suited for self-piercing applications, it may be used equally well in prepierced applications.

17 Claims, 6 Drawing Sheets

U.S. PATENT DOCUMENTS

| | | | |
|---|---|---|---|
| 3,344,316 | 9/1967 | Stelmak | 361/773 |
| 3,419,298 | 12/1968 | Worley | 403/24 |
| 3,436,803 | 4/1969 | Sarnoff | 29/432.2 |
| 3,456,704 | 7/1969 | Johnson | 411/284 |
| 3,507,313 | 4/1970 | Stockslager | 411/284 |
| 3,640,326 | 2/1972 | Brown | 151/37 |
| 3,754,731 | 8/1973 | Mackal et al. | 251/145 |
| 3,800,401 | 4/1974 | Jesevich et al. | 29/432.2 |
| 3,871,264 | 3/1975 | Hallock | 85/30 |
| 3,926,236 | 12/1975 | Pouch et al. | 151/41.73 |
| 3,938,239 | 2/1976 | Lauth | 29/512 |
| 4,018,257 | 4/1977 | Jack | 151/41.72 |
| 4,039,099 | 8/1977 | Boxall | 220/91 |
| 4,092,773 | 6/1978 | Donahue | 29/512 |
| 4,193,333 | 3/1980 | Hallock | 85/31 |
| 4,459,073 | 7/1984 | Muller | 411/176 |
| 4,820,235 | 4/1989 | Weber et al. | 411/188 |
| 4,957,401 | 9/1990 | Hatter | 411/436 |
| 5,092,724 | 3/1992 | Muller | 411/179 |

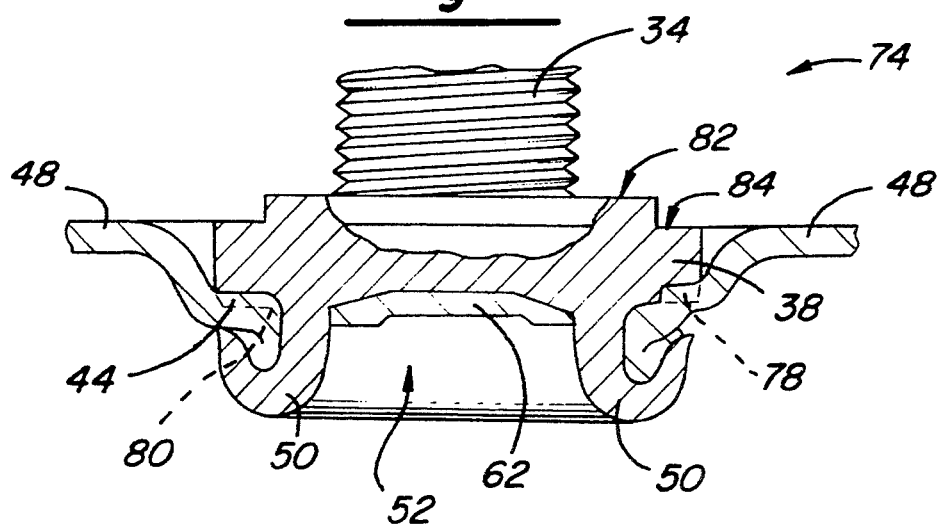
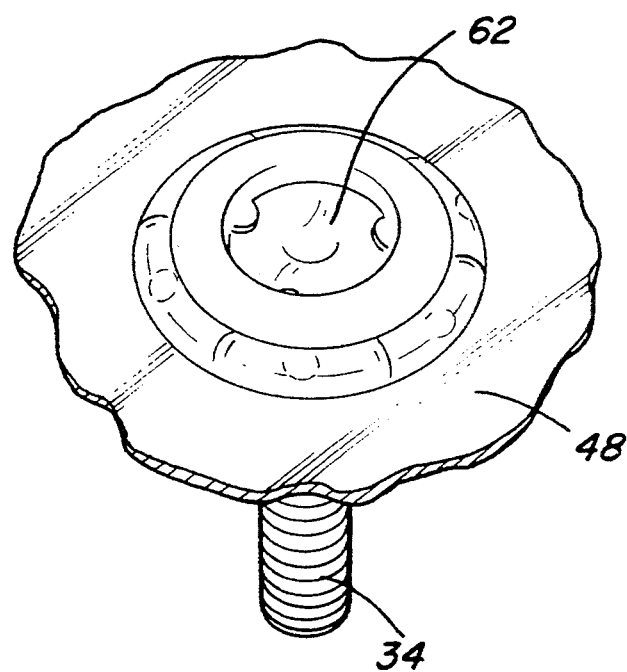

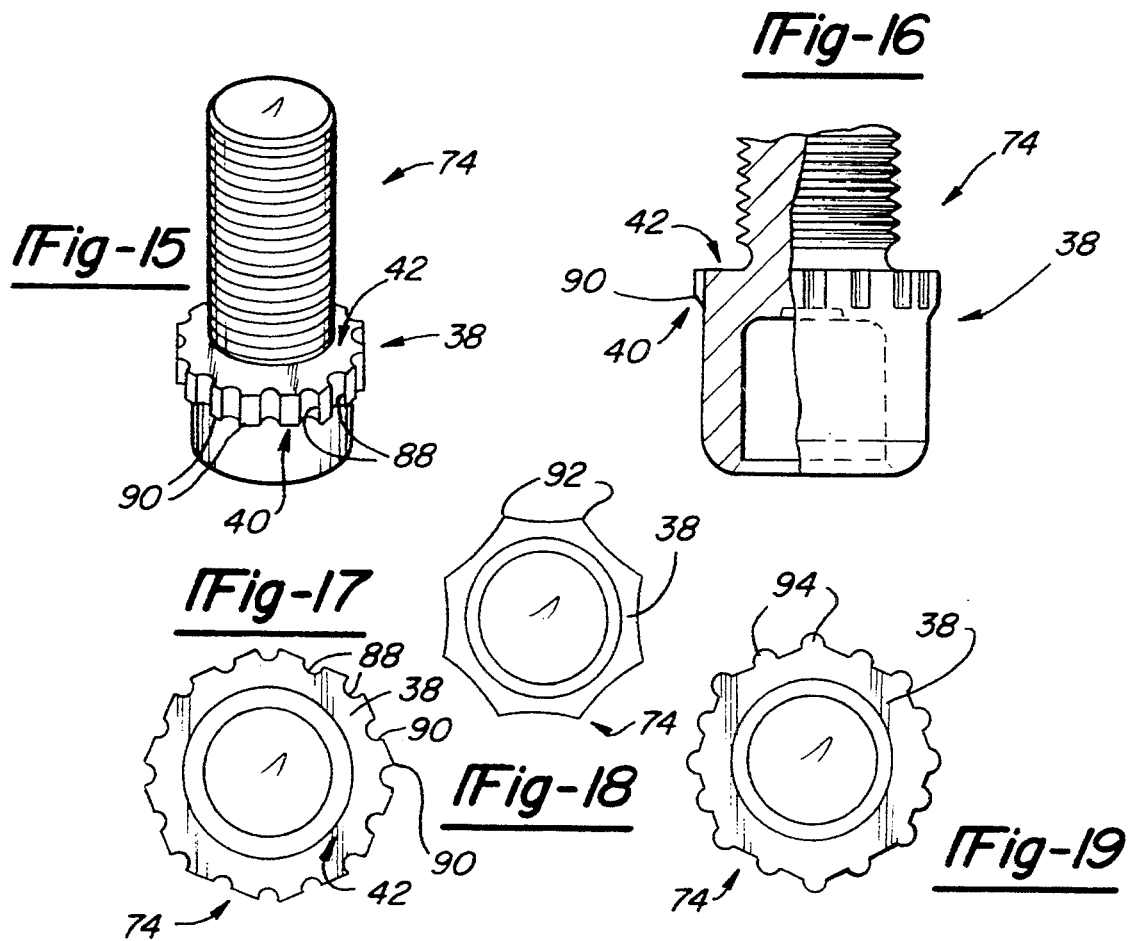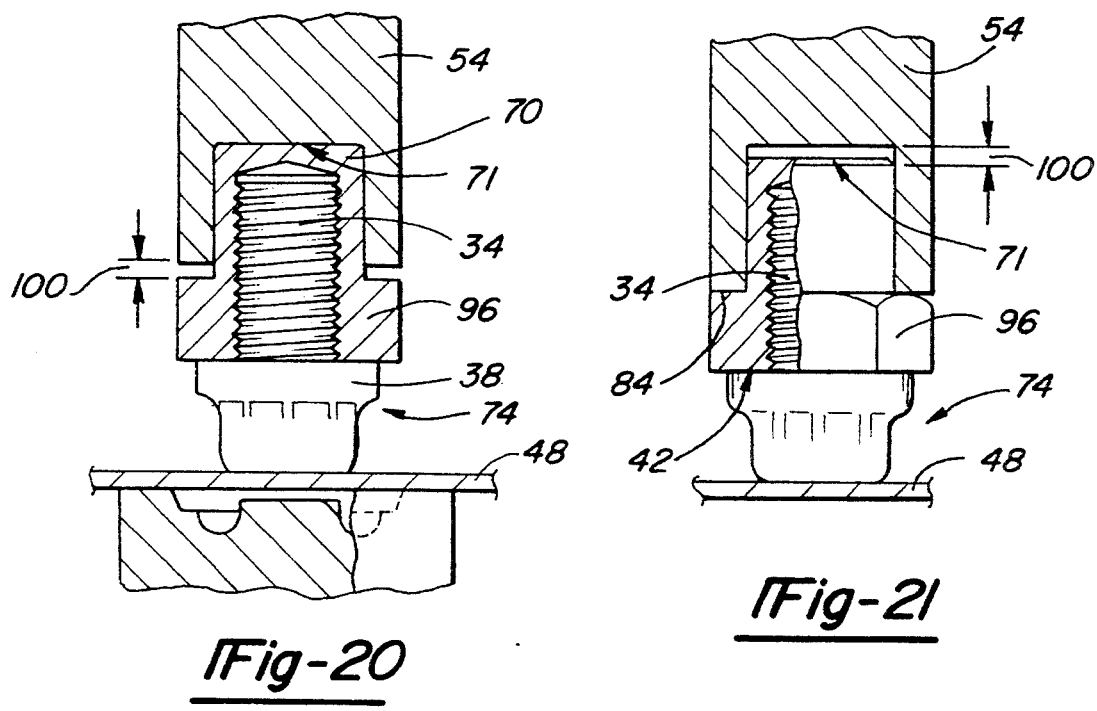

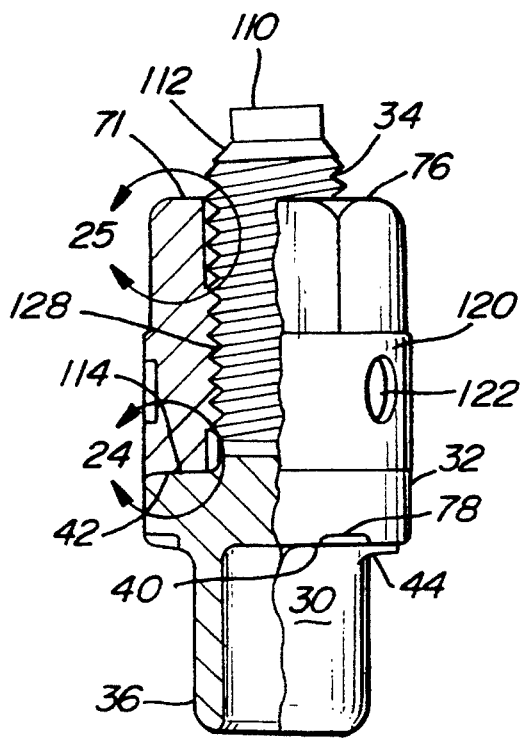
Fig-22
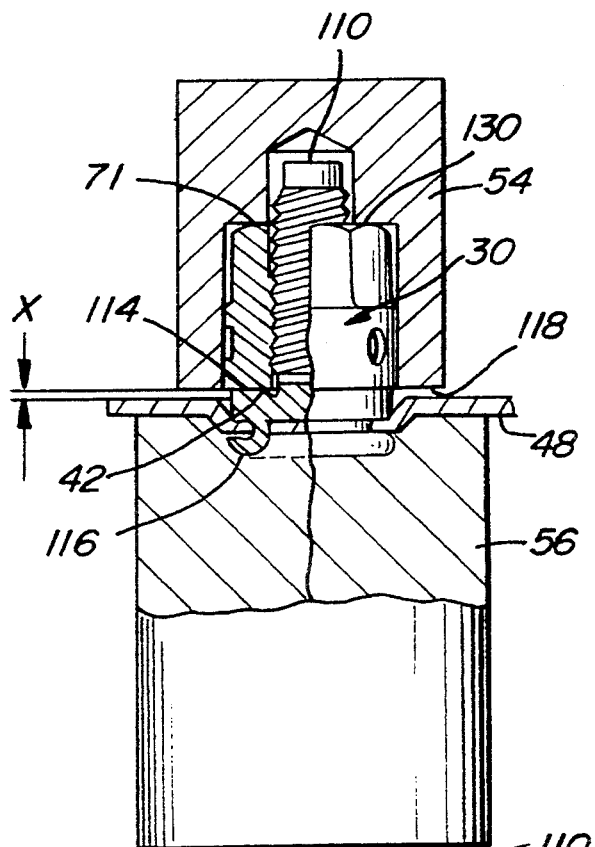
Fig-23
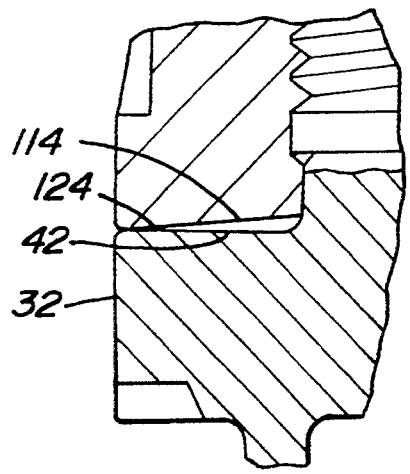
Fig-24
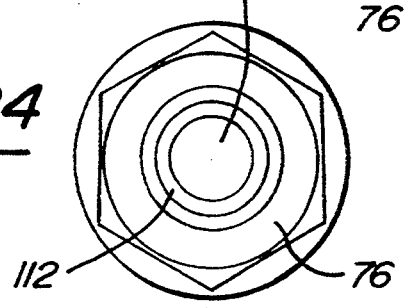
Fig-26
Fig-25

ELECTRICAL GROUNDING STUD

RELATED APPLICATIONS

This application is a continuation-in-part of U.S. patent application Ser. No. 786,243, filed Oct. 31, 1991, which application was a continuation-in-part of U.S. patent application Ser. No. 491,925, filed Mar. 12, 1990, now U.S. Pat. No. 5,092,724, which application is a divisional application of U.S. patent application Ser. No. 196,209, filed May 19, 1988, now U.S. Pat. No. 4,915,558, which application is a divisional application of Ser. No. 892,017, filed Aug. 1, 1986, now U.S. Pat. No. 4,765,057, which application is a divisional application of Ser. No. 773,387, filed Sep. 6, 1985, now U.S. Pat. No. 4,633,560, which application is a divisional application of Ser. No. 563,833, filed Dec. 21, 1983, now U.S. Pat. No. 4,555,838, which application is a continuation-in-part application of Ser. No. 485,099, filed Mar. 28, 1983, now U.S. Pat. No. 4,459,073, and Ser. No. 504,074, filed Jun. 14, 1983, now U.S. Pat. No. 4,543,701, which applications are, respectively, divisional and continuation applications of Ser. No. 229,274, filed Jan. 28, 1981, now abandoned, which claims priority to an application filed Feb. 2, 1980, in the Federal Republic of Germany, Serial No. 3003908.

TECHNICAL FIELD

The present invention generally relates to fasteners and more particularly relates to riveting fasteners, including studs, bolts, nuts or the like, including methods of attaching such fasteners to an electrically conductive panel, wherein the fastener primarily functions as an electrical grounding connection to the electrically conductive panel.

BACKGROUND OF THE INVENTION

U.S. Pat. No. 3,299,500 and 3,314,138, disclose self-piercing female elements, including nuts, which may be simultaneously clinched to secure the nut in a panel opening. Additionally, U.S. Pat. Nos. 3,938,239 and 4,018,257, disclose self-riveting nuts, including nuts having an annular skirt or barrel portion wherein the free end of the barrel portion is deformed radially outwardly in a die member to form a mechanical interlock with a panel. However, the self-riveting nuts disclosed in the above referenced patents are secured to the panel having a prepierced panel opening. This has the disadvantage of requiring two separate operations, the first operation involves creating the panel opening, and a second operation involves installing the female fastener. Additionally, such methods also require very precise centering of the nut relative to the prepierced panel opening, wherein a spring biased pin is received through the panel opening and the nut is centered on the pin prior to installation. U.S. Pat. No. 3,926,236, discloses a method of attaching a nut to a panel wherein the panel is pierced by a punch which extends through the nut bore to pierce and secure the nut to a panel in continuous operation, however, the fastener is not a riveting-type fastener which has a barrel portion extending through the pierced panel opening.

U.S. Pat. No. 3,800,401, discloses methods of attaching closures to a container such as a tag ring in a continuous operation. This application and the above-referenced related patents and applications disclose methods and apparatus for attaching male and female elements to a panel in a continuous operation. The preferred methods of installation do not require prepiercing of the panel, although the fastener is equally suited for installing in a prepierced panel opening.

U.S. Pat. Nos. 4,193,333 and 3,871,264, disclose means of attaching a stud-like fastener, wherein the stud includes an annular end portion which penetrates a plate or structural steel member, which may be deformed radially around a plug pierced from the panel.

U.S. Pat. Nos. 1,976,019; 2,456,118; 2,521,505; 3,436,803; 3,754,731; 4,039,099; and 4,092,773, disclose various riveting techniques, wherein the fastener includes an annular end portion which may be press-fitted through an opening in a panel. The annular end portion is then riveted or radially outwardly deformed by a die member having an annular semi-toroidal die cavity and may include a projecting central die portion which is received in the annular riveting end of the fastener.

Although the above-referenced patents do disclose self-riveting male and female fasteners, and methods of installing same, they do not disclose a riveting stud type fastener which is suited for making a reliable electrical grounding connection to a metal panel or the like. For example, U.S. Pat. Nos. 4,193,333 and 3,871,264, which disclose methods of attaching stud fasteners to a panel, primarily teach a methodology for providing superior mechanical interlock between the stud fastener and the panel and do not address the issue of the electrical integrity of the connection. It is well known that a fastener can provide excellent mechanical bonding to a panel while providing unacceptable electrical conductivity to the same panel. For example, various coatings could be present on an electrically conductive panel which, although not interfering with the mechanical interlock between the stud fastener and the panel, may partially, or entirely impede the flow of electrical current through the fastener and panel interface.

Accordingly, it is the primary object of this invention to provide a stud type fastener which is adapted to be attached to an electrically conductive panel wherein the fastener provides both superior mechanical connection to the panel while also providing excellent electrical conductivity across the fastener/panel interface. Further, the fastener and method herein disclosed are particularly suited for mass production applications, particularly automotive applications utilizing automatic presses. The fastener of the present invention can be used in a panel having a free pierced opening, but is not limited to free pierced applications inasmuch as the present fastener is adapted to pierce the panel during the insulation process.

SUMMARY OF THE INVENTION

In light of the foregoing, the present invention provides an electrical grounding connector for attachment to an electrically conductive panel. The electrical grounding connector is of the type having a body portion disposed between, an integrally joining, a stud portion and a riveting portion, the body portion includes a flange portion extending generally radially from the body portion, the flange portion including a panel engaging surface and a lug engaging surface. The electrical grounding connector includes a first barb disposed on at least one of the riveting portion and the panel engaging surface of the flange portion for conducting electrical current between the electrical grounding connector and the conductive panel when the electrical grounding connector is joined to the electrically conductive panel. A second barb is disposed on at least one of the stud portion and the lug engaging surface of the flange portion for conducting electrical current between the electrical grounding connector and a conductive lug when the conductive lug is joined to the electrical grounding connector. The barbs act to penetrate any non-conductive material disposed on the electrically conductive panel or the lug such as paint or other coatings thereby providing electrical continuity between the lug and the electrically conductive panel via the electrical grounding connector.

Preferably, the riveting portion of the electrical grounding connector includes an annular wall for defining a socket within the riveting portion and also the annular wall is preferably adapted to pierce the electrically conductive panel. The annular wall of the electrical grounding connector is preferably continuous and is adapted to pierce a slug from the electrically conductive panel. Preferably the first barb extends between, and is integral with, the riveting portion and the panel engaging surface of the flange portion of the electrical grounding connector. Preferably the second barb extends between, and is integral with, the stud portion and the lug engaging surface of the flange portion.

In a preferred embodiment, the second barb includes a projection having a generally polyhedron form and the flange portion of the electrical grounding connector preferably includes an outer surface having a generally cylindrical contour.

In an alternative embodiment, the present invention includes an electrical grounding connector assembly for attachment to an electrically conductive panel, the electrical grounding connector assembly of the type having a portion disposed between, and integrally joining, a stud portion and a riveting portion, the body portion including a flange portion extending generally perpendicular from the body portion, the flange having a panel engaging surface and a lug engaging surface. The electrical grounding connector assembly includes barbed means, disposed on at least one of the riveting portion and the panel engaging surface of the flange portion, for conducting electrical current between the electrical grounding connector assembly and the conductive panel when the electrical grounding connector is joined to the electrically conductive panel. Also, the electrical grounding connector assembly includes a cap adapted to cooperatively engage and substantially cover the stud, and also adapted to cover the lug engaging surface of the flange thereby protecting the stud portion and the lug engaging surface of the flange from contaminants.

Preferably, the riveting portion of the electrical grounding connector assembly includes an annular wall defining a socket within the riveting portion wherein the annular wall is adapted to pierce the electrically conductive panel. The annular wall of the electrical grounding connector assembly is preferably continuous and is adapted to pierce a slug from the electrically conductive panel. The barbed portion preferably extends between, and is integral with, the riveting portion and the panel engaging surface of the flange portion. The flange portion of the electrical grounding connector assembly preferably includes an outer surface having a generally cylindrical contour.

The lug engaging surface of the flange of the electrical grounding connector assembly preferably includes a portion proximate the stud wherein the portion of the stud proximate the stud is raised relative to a portion of the flange distal the stud. The portion of the flange distal the stud preferably includes a plunger engaging surface for engaging a plunger which is adapted to drive the connector assembly into the electrically conductive panel.

In one embodiment of the electrical grounding connector assembly, the panel engaging surface of the flange includes a plurality of spaced pockets. Other embodiments of the electrical grounding connector assembly include a flange portion which has a generally polygonal outer surface. Still other embodiments include a generally polygonal flange portion which has depressions (or channels) superimposed thereon and the depressions are preferably arcuate. Other embodiments include a flange portion having a general polygonal contour which has arcuate raised surfaces superimposed thereon. Yet, in another embodiment, the flange portion of the electrical grounding connector assembly includes an outer surface having a generally hypocycloid contour. Preferably, the hypocycloid outer contour includes eight cusps.

In a preferred embodiment of the electrical grounding connector assembly, the cap is made from a metal and includes a load bearing flange having first and second opposed load bearing surfaces. The first load bearing surface is adapted to engage the lug engaging surface of the flange portion of the grounding stud connector and the second load bearing surface is adapted to engage a plunger which is adapted to drive the grounding connector assembly into the electrically conductive panel. In an alternative embodiment, the metal cap includes first and second load bearing, opposing ends, wherein the first load bearing end is adapted to engage the lug engaging surface of the flange portion of the grounding connector and the second load bearing end is adapted to engage a plunger for driving the connector assembly into the conductive panel.

Still, in another aspect, the electrical grounding connector assembly of the present invention includes a male fastener fastened to a plastically deformable panel member and a female element which engages the male fastener. The male fastener includes a body portion disposed between, and integrally joining, a stud portion and a riveting portion, the body portion includes a flange extending generally radially outward from the body portion, the flange includes a panel engaging surface and a lug engaging surface, the riveting portion terminating in a radially deformed lip, the male fastener also including first barbed elements disposed on at least one of the panel engaging surface of the flange and the riveting portion for conducting electrical current between the male fastener and the electrically conductive member. The plastically deformable, electrically conductive panel member includes an opening intimately surrounding the riveting portion of the male fastener. The male fastener is entrapped within the panel opening between the radially deformed lip and the radially extending flange wherein the first barbed element is in continuous electrical contact with the electrically conductive panel thereby forming an electrically conductive path between the electrically conductive panel and the male fastener. The female element includes a body portion having an axial bore therein, the axial bore being adapted to engage the stud portion of the male fastener, wherein the female element is adapted to cover the stud portion of the male fastener and also cover the lug engaging surface of the flange thereby protecting the stud portion and the lug engaging surface of the flange from contaminants.

The radially deformed lip of the riveting portion is preferably deformed outwardly and comprises a generally U-shaped channel which opens generally toward the flange portion of the male fastener. The panel member preferably includes a generally planar portion distal the panel opening and a deformed panel portion proximate the panel opening, the deformed panel portion being displaced form the planar portion, the deformed panel portion thereby engaging the first barbed element and providing a path for electric current between the panel member and the male fastener. Preferably, the riveting portion includes an annular wall which defines a socket within the riveting portion and the annular wall is preferably adapted to pierce the electrically conductive panel member. The annular wall is preferably continuous and is adapted to pierce a slug from the electrically conductive panel. The first barbed means preferably extends between, and is integral with, the riveting portion and the penal engaging surface of the flange portion. The flange portion includes an outer surface having a generally cylindrical contour.

In a preferred embodiment, the lug engaging surface of the flange includes a portion of the flange proximate the stud wherein the portion of the flange proximate the stud is raised relative to the portion of the flange distal the stud. The flange portion distal the stud preferably includes a plunger engaging surface for engaging a plunger which is adapted to drive the connector assembly into the electrically conductive panel. Preferably, the panel engaging surface of the flange includes a plurality of spaced pockets.

Preferably, a second barbed element is disposed on at least one of the stud portion and the lug engaging surface of the flange portion, for conducting electrical current between the male fastener element and a conductive lug when the conductive lug is forced against the second barbed element by the female element. The female element is preferably metal and, in one preferred embodiment includes a load bearing flange having a first and second opposed load bearing surfaces, the first load bearing surface being adapted to engage the lug engaging surface of the flange portion of the grounding stud connector and the second load bearing surface being adapted to engage a plunger, wherein the plunger is adapted to drive the grounding connector assembly into the electrically conductive panel. In the second preferred embodiment, the metal female element includes first and second load bearing, opposing ends, the first load bearing end adapted to engage the lug engaging surface of the flange portion of the ground connector and the second load bearing end adapted to engage a plunger wherein the plunger is adapted to drive the connector assembly into the conductive panel.

In another preferred embodiment, one of the opposed surfaces of the flange portion of the stud or male fastener and the female nut is conical or dished, such that the surfaces converge radially to provide a generally circular line contact preferably near the radial outer edge of the flange portion. This line contact prevents entry of foreign material, such as paint or undercoat, maintaining a clean surface for good electrical contact. The female fastening element or nut of this embodiment has an open end, such that the free end of the stud portion of the male fastener is exposed, and the nut includes a bearing surface which receives the installation tool. In the most preferred form of this embodiment, a slight radial space or clearance is provided between the nut and the threaded portion of the stud adjacent the bearing surface of the nut, reducing deformation of the threads during installation.

The present invention also contemplates a method of attaching an electrical grounding connector assembly to an electrically conductive panel, the electrical grounding connector assembly of the type having a grounding stud connector and a dlsplaceable cap, the grounding stud connector having a body portion disposed between, and integrally joining, a stud portion and a riveting portion, the body portion including a flange portion extending generally radially from the body portion, the flange having a panel engaging surface and a lug engaging surface, the electrical grounding connector assembly including barbed elements disposed on at least one of the riveting portion and the panel engaging surface of the flange portion, for conducting electrical current between the electrical grounding connector assembly and the conductive panel when the electrical grounding connector is joined to the electrically conductive panel, the displaceable cap being adapted to cooperatively engage and substantially cover the stud portion and also adapted to cover the lug engaging surface of the flange thereby protecting the stud portion and the lug engaging surface of the flange from contaminants. The method comprising the steps of: (a) placing the riveting portion of the electrical grounding connector assembly adjacent the electrically conductive panel; (b) passing the riveting portion through the panel thereby causing the barbed elements to contact the panel providing a path for electrical current between the electrical grounding connector assembly and the panel; (c) radially deforming the riveting portion of the grounding stud connector thereby mechanically bonding the electrical grounding connector assembly to the panel; (d) displacing the cap from the lug engaging surface; and (e) securing an electrically conductive lug against the lug engaging surface of the flange. Preferably the step (b) of the method includes simultaneously using the riveting portion of the grounding stud connector for piercing a slug from the panel. Step (c) of the method preferably includes deforming the panel riveting portion of the grounding stud connector into a U-shaped channel, the channel opening generally toward the flange of the grounding stud connector wherein the panel substantially fills the U-shaped opening in interlocking engagement therewith. Step (b) of the method can be performed by exerting a force against the flange portion of the grounding stud connector and can also be performed by exerting a force against the cap. Preferably, step (e) is performed by moving the displaced cap toward the lug engaging surface of the flange.

The connector and connector assembly of the present invention is particularly suited for transfer from a hopper or other source to an installation device. The connector and a connector assembly may be arrayed within the installation device by automatic means that stacks and aligns the connectors readying them for installation.

It will be understood by those skilled in the art that the terms used herein to generally describe the connector (such as female and male connectors) are used only as short-hand labels and the actual geometry of the connectors may take on a multiplicity of forms. As used herein, "connector" or "fastener" refers not only to the function of the connector or fastener to attach one member to a panel, but also the means of attaching the fastener or connector to the panel.

Other advantages and meritorious features will be more fully understood from the following description of the preferred embodiments of the grounding connector, grounding connector assemblies and method of installing same, the appended claims and the drawings, a brief description of which follows.

BRIEF DESCRIPTION OF THE DRAWINGS

FIG. 13 is a partial cross-sectional view of the second embodiment of the electrical grounding stud of the present invention installed in an electrically conductive panel.

FIG. 14 is an isometric top view of the second embodiment of the electrical grounding stud of the present invention installed in an electrically conductive panel.

FIG. 15 is an isometric view of a third embodiment of the electrical grounding stud of the present invention.

FIG. 16 is a partial cross-sectional side view of the third embodiment of the electrical grounding stud of the present invention shown in FIG. 15.

FIG. 17 is a bottom view of the third embodiment of the electrical grounding stud of the present invention.

FIG. 18 is a bottom view of a fourth embodiment of an electrical grounding stud of the present invention.

FIG. 19 is a fifth embodiment of an electrical grounding stud of the present invention.

FIG. 20 is a partial cross-sectional side view of a sixth embodiment of the electrical grounding stud of the present invention shown assembled to a third embodiment of a protective nut.

FIG. 21 is a partial cross-sectional side view of the electrical grounding stud of FIG. 20 assembled to a fourth embodiment of a protective nut of the present invention.

FIG. 22 is a partially cross-sectioned side view of a further embodiment of an electrical grounding connector.

FIG. 23 is a longitudinal cross-section through the electrical grounding connector of FIG. 22, after assembly with a panel member and before withdrawal of the press tool.

FIG. 24 is a detail cross-section of FIG. 22, as shown by view arrow 24.

FIG. 25 is a detail cross-section of FIG. 22, as shown by view arrow 25.

FIG. 26 is a top plan view of the electrical grounding connector of FIG. 22.

DETAILED DESCRIPTION OF THE PREFERRED EMBODIMENTS

The electrical grounding connector and grounding connector assembly of the present invention is particularly adapted for permanent attachment to a panel or plate, particularly a metal sheet or the like, such as utilized in the automotive and appliance industries. The disclosed electrical grounding connector and assembly is particularly well suited for installation by way of conventional press apparatus typical of that utilized in the automotive industry. The method of the present invention is also well suited for application by way of conventional press. In such applications, the press installs one or more connector assemblies with each stroke wherein the connector assemblies become a permanent part of the panel and are utilized to affix other members such as brackets or the like to the panel. Further, the electrical grounding connector of the present invention is particularly suited for attachment to relatively thin sheets or panels, such as utilized by the appliance industries. Accordingly, as used herein, "panel" refers to any plate, panel, or metal sheet having sufficiently high electrical conductivity to be considered an effective electrical conductor and a thickness sufficiently thin for practical application of the riveting portion of the grounding connector.

Figure 1:
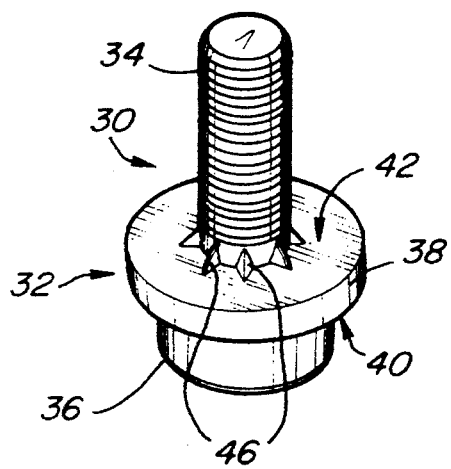
FIG. 1 is an isometric view of a first embodiment of the electrical grounding stud of the present invention.

Now referring to FIG. 1, in a first embodiment, the electrical grounding stud (or connector) 30 of the present invention includes body portion 32 disposed between, and integrally joining, stud portion 34 and riveting portion 36. Body portion 32 includes flange 38 which extends generally radially from body portion 32 and includes panel engaging surface 40 and lug engaging surface 42.

Figure 2:
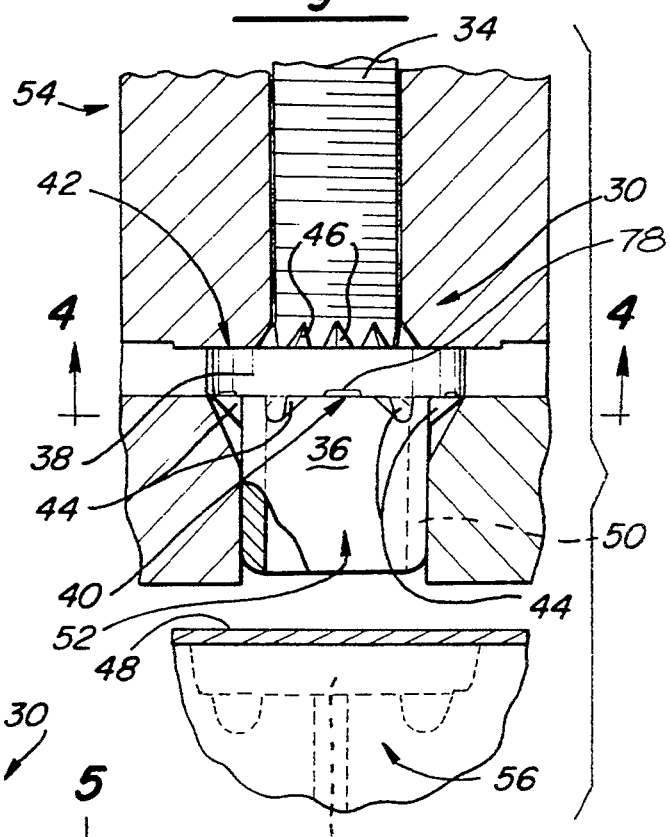
FIG. 2 is a partial cross-sectional view of the electrical grounding stud of FIG. 1 and a typical installation apparatus.

Now referring to FIGS. 1 and 2, first barbed elements 44 are disposed on at least panel engaging surface 40 or riveting portion 36 of grounding stud 30 and preferably first barbed elements 44 are integral to, and spanned between, panel engaging surface 40 and riveting portion 36. Second barbed elements 46 are disposed on at least stud portion 34 or lug engaging surface 42 and are preferably integral with and span between stud portion 34 and lug engaging surface 42.

As disclosed in U.S. Pat. Nos. 4,831,698; 4,555,838; and 4,610,072 (hereinafter '698, '838 and '072 respectively), disclosures of which are herein incorporated by reference, electrical grounding stud 30 is adapted to be riveted to plastically deformable electrically conductive panel 48. As disclosed in the '838 patent, riveting portion 36 of grounding stud 30 preferably includes annular wall 50 defining socket 52 within riveting portion 36. As disclosed in the '838 patent, plunger 54 is adapted to cooperate with die member 56 to drive riveting portion 36 of grounding stud 30 through electrically conductive panel 48 thereby deforming riveting portion 36 radially outward forming a secure mechanical interlock between stud 30 and conductive panel 48.

Figure 3:
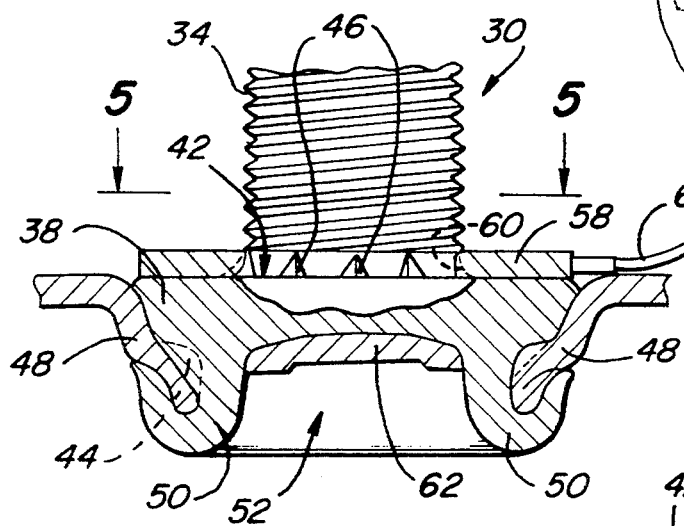
FIG. 3 is a partial cross-sectional side view of the electrical grounding stud of FIG. 1 shown installed in an electrically conductive panel.
Figure 4:
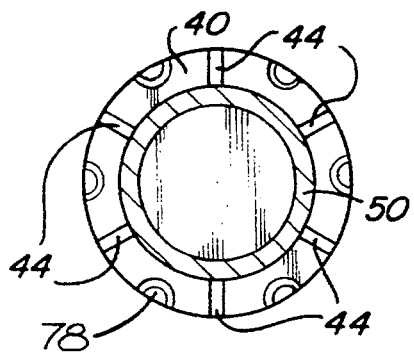
FIG. 4 is a partial cross-sectional top view of the first embodiment of the electrical grounding stud of the present invention taken substantially along lines 4—4 of FIG. 2.
Figure 5:
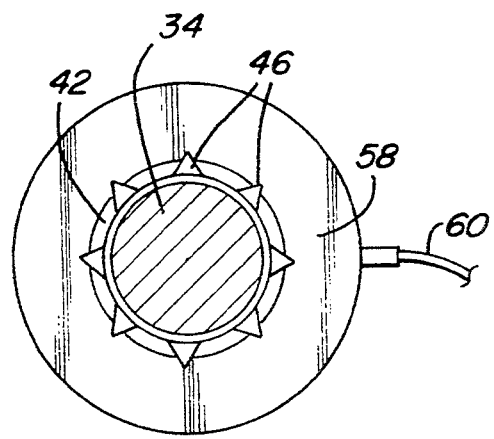
FIG. 5 is a cross-sectional bottom view of the first embodiment of the electrical grounding stud of the present invention taken substantially along lines 5—5 of FIG. 3.

Now referring to FIGS. 1-3, as plunger 54 drives riveting portion 36 of grounding stud 30 into electrically conductive panel 48, first barbed elements 44 eventually contact, and are driven into, and penetrate, the surface of panel 48. If grounding stud 30 is fashioned without first barbed elements 44 (such as is the stud disclosed in the '838 patent) any non-conductive substance disposed between grounding stud 30 and panel 48 increases the electrical resistance between grounding stud 30 and panel 48 thereby undesirably affecting the grounding capacity of grounding stud 30 and panel 48. In automotive applications, it is common for paints, rust preventative coatings, oils, and other non-electrically conductive (or poor electrically conductive) substances to be deposited (either intentionally or unintentionally) on surfaces of a panel 48 which is to have a grounding stud 30 affixed to it. Because of these materials which reside, or inevitably find their way between grounding stud 30 and panel 48, the fastener set out in the '838 patent (which does not utilize first grounding barbed elements 44) was not effective as an electrical grounding stud (notwithstanding the highly effective mechanical bond between grounding stud 30 and panel 48). By adding first barbed elements 44 to grounding stud 30, any electrically non-conductive residue disposed between grounding stud 30 and panel 48 is penetrated through, and displaced, by first barbed elements 44 during the installation process as first barbed elements 44 penetrate the surface of electrically conductive panel 48. This penetrating engagement between barbed elements 44 and panel 48 creates an excellent bridge for electrical current between the two mating materials. In prototypes of the present invention, it has been demonstrated that when grounding stud 30 of the present invention is installed on panels which are coated with electrically non-conductive substances such as paint, rust preventative coatings and the like, excellent results are achieved and grounding stud 30 forms an excellent current path to panel 48.

In an application, as shown in FIG. 3, an electrically conductive grounding lug 58 is connected to an electrical wire 60 which is to be grounded to panel 48. Grounding stud 30 of the present invention, once fastened to electrically conductive panel 48, provides a simple and inexpensive way of grounding lug 58. If lug 58 is in the form of a "eye" lug, the aperture 60 of lug 58 is passed over stud portion 34 of grounding stud 30 and pressed against lug engaging surface 42 by a nut (nut not shown in FIG. 3) or other similar means. By exerting sufficient force upon lug 58, second barbed elements 46 cut into lug 58 thereby displacing any electrically non-conductive contaminants which may reside therebetween ensuring a high integrity electrical connection between lug 58 and grounding stud 30.

As those skilled in the art will readily recognize, the presence of first and second barbed elements 44, 46 respectively, provide a means of securing an electrical grounding lug 58 to a panel 48 in a way which provides an electrical grounding connection of high integrity. Thus, the lug of the present invention overcomes the problems of the prior art lugs which serve as superior mechanical connectors to panel 48, but do not provide the electrical resistance characteristics needed for grounding applications.

Now referring to FIGS. 1-5, although first and second barbed elements 44, 46 respectively may be fashioned into any number of geometries, excellent results have been achieved using polyhedron type geometries as seen in FIG. 1 through FIG. 5. It will be understood by those skilled in the art, that a primary concern in achieving good electrical conductivity between lug 58 and grounding stud 30, and grounding stud 30 and panel 48 is primarily a function of the ability of first and second barbed elements 44, 46 to "bite into" and penetrate the surface of lug 58 and panel 48. Thus, in order to achieve the lowest possible electrical resistance between interfacing surfaces, the material composition of lug 58 and panel 48 will have a direct bearing on the preferred geometry and hardness of first and second barbed elements 44, 46.

As disclosed in the aforementioned patents, riveting portion 36 of grounding stud 30 can be used in panels 48 having prepierced openings. Although this may be desirable in some installations, riveting portion 36 is also suited to pierce panel 48 during installation thereby creating its own panel openings. During this piercing operation, slug 62 is severed from panel 48 and can be either discarded through die opening 64 of die member 56 or, in the alternative, can be permanently staked within socket 52. Various techniques for staking slug 62 within socket 52 are disclosed in U.S. Pat. Ser. No. 07/728,469, which is hereby incorporated by reference.

Figure 6:
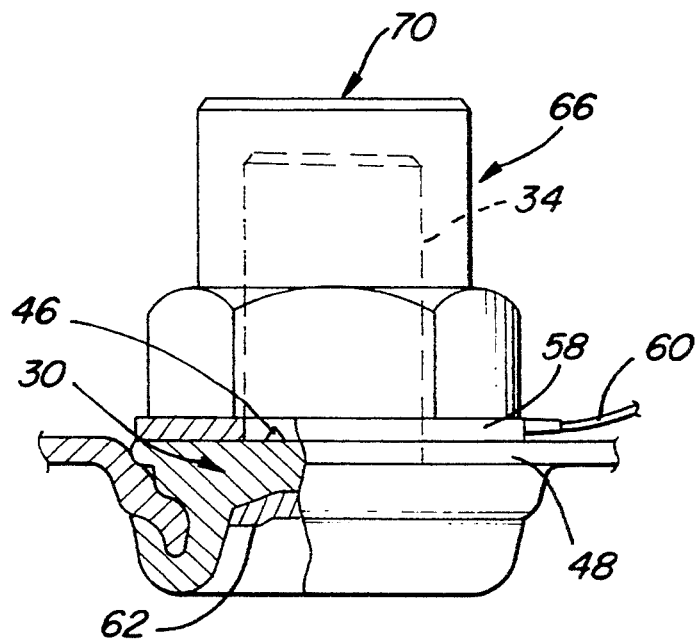
FIG. 6 is a partial cross-sectional view of the first embodiment of the electrical grounding stud assembly of the present invention shown installed in a panel the assembly including a grounding lug and a first embodiment of a protective lug nut of the present invention.
Figure 7:
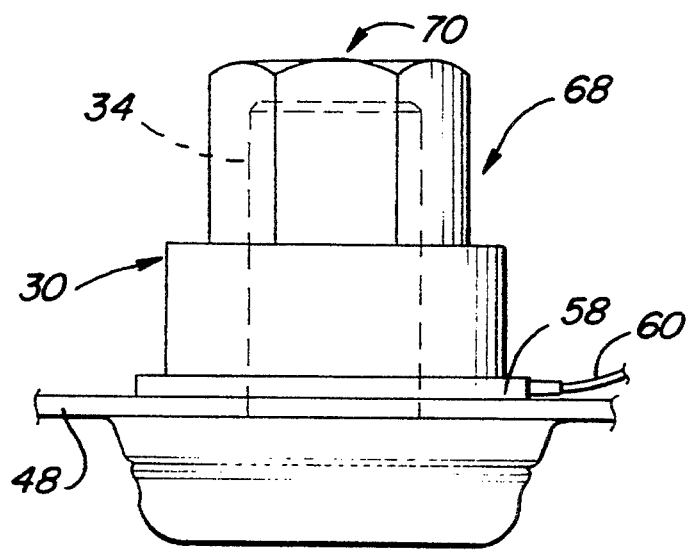
FIG. 7 is a side view of the first embodiment of the electrical grounding stud of the present invention shown installed in a panel with a grounding lug and a second embodiment of the protective lug nut of the present invention.

Now referring to FIGS. 6 and 7, although many different styles of nuts 66, 68 may be used to secure grounding lug 58 to grounding stud 30, the preferred nut includes one open end and one closed end (closed end indicated at 70). The open end functions to provide a passage way for stud portion 34 of grounding stud 30 to gain entrance into nuts 66, 68 and closed end 70 prevents paint, undercoating or the like from contacting the threads of stud portion 34 or various electrically conductive surfaces of grounding stud 30. Accordingly, nut 66, 68 prevent paint, undercoating or the like from hampering the electrical integrity between lug 58 and stud 30. Nut 66 differs from that of nut 68 in that nut 66 has a polygonal outer surface along the lower half of its structure while nut 68 has a polygonal surface along the upper half of its structure. Depending upon the particular application, type of installation tools used, and the like, one disclosed embodiment may be desirable over the other. However, each nut 66, 68 functions identically to force lug 58 against second barbed elements 46 thereby forming an electrical connection therebetween of high integrity and, also, functions to keep contaminants and other undesirable substances from contacting stud portion 34 or lug 58. Although only one lug is disclosed in FIGS. 6 and 7, it is to be understood by those skilled in the art that multiple lugs may be electrically accommodated by a single grounding stud 30 where such a requirement is desirable.

Figure 8:
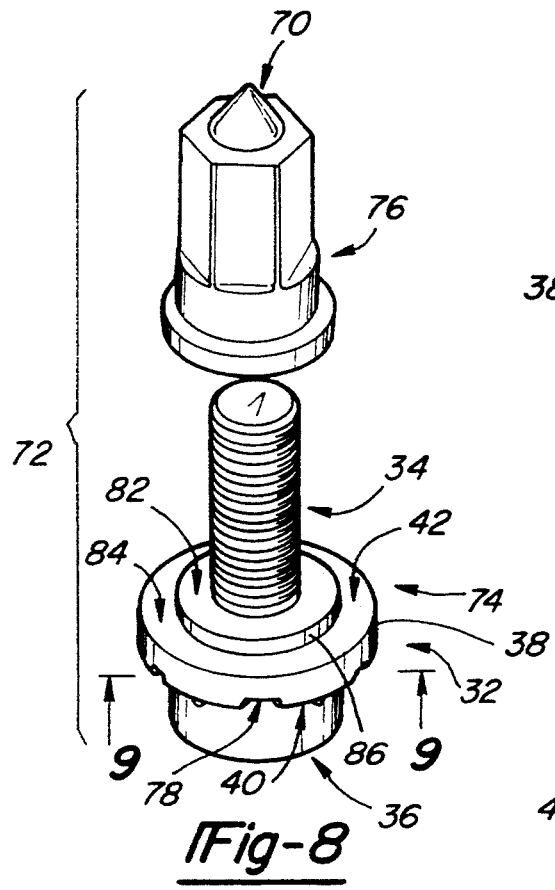
FIG. 8 is an isometric view of a second embodiment of an electrical grounding stud of the present invention and a third embodiment of the protective lug nut of the present invention.
Figure 9:
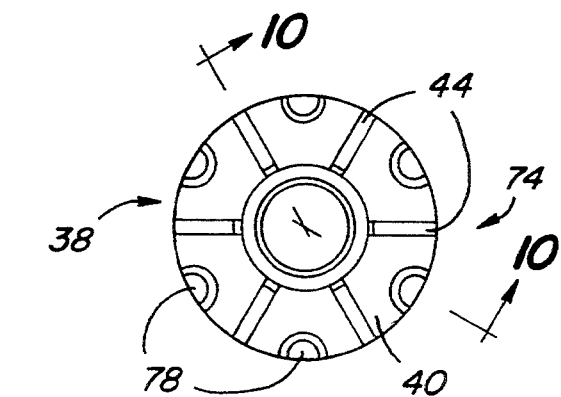
FIG. 9 is a top view of the second embodiment of the electrical grounding stud of the present invention taken substantially along lines 9—9 of FIG. 8.
Figure 10:
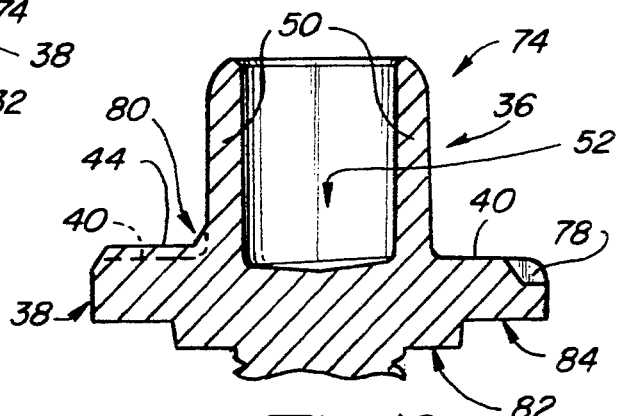
FIG. 10 is a partial cross-sectional side view of the second embodiment of the electrical grounding stud of the present invention taken substantially along lines 10—10 of FIG. 9.
Figure 11:
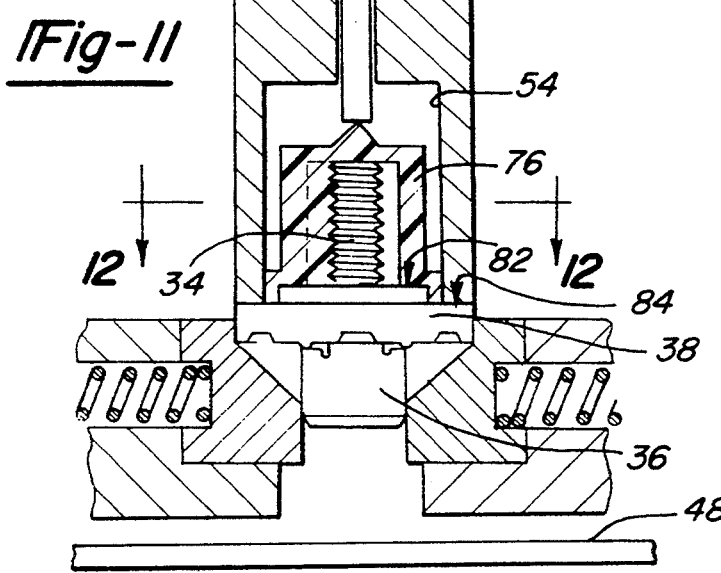
FIG. 11 is a partial cross-sectional view of a typical installation apparatus used to install the second embodiment of the electrical grounding stud of the present invention into an electrically conductive panel.
Figure 12:
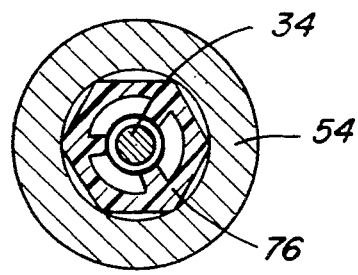
FIG. 12 is a cross-sectional bottom view of the second embodiment of the electrical grounding stud of the present invention and the installation plunger of a typical installation apparatus taken substantially along lines 12—12 of FIG. 11.

Now referring to FIGS. 8–10, a second embodiment of the grounding connector of the present invention includes an electrical grounding connector assembly 72. The assembly 72 includes a second embodiment of electrical grounding stud 30 (second embodiment indicated at reference numeral 74) and protective cap 76. The primary difference between electrical grounding connector assembly 72 and that disclosed in conjunction with FIGS. 1–6, is that the assembly 72 is adapted to be installed, as an assembly, into a panel in a single installation operation. This will be further described in reference to FIGS. 8–14.

Now referring to FIGS. 8–10, electrical grounding stud 74 includes body portion 32, stud portion 34, and riveting portion 36. As disclosed in conjunction with grounding stud 30, body portion 32 is disposed between, and integrally joins, stud portion 34 and riveting portion 36. Body portion 32 includes flange 38 which extends generally radially from body portion 32. Flange 38 includes panel engaging surface 40 and lug engaging surface 42. Panel engaging surface 40 of flange 38 includes first barbed elements 44 and pockets 78. Barbed elements 44 generally rise above panel engaging surface 40 while pockets 74 generally reside below panel engaging surface 40. While first barbed elements 44 function identically to that disclosed in the first embodiment of electrical grounding stud 30 (as discussed in conjunction with FIGS. 1–7), they also provide, in conjunction with pockets 78, superior anti-rotation resistance upon fastening grounding stud 74 to a panel. The superior anti-rotation resistance is largely due to the fact that the combination of elevated barbs 44 and depressed pockets 78 accommodate under-hit and over-hit conditions which are typically associated with fastener installations techniques which use presses. As understood by those skilled in the art, it is impossible to control the precise stroke upon that a press platen will travel during the course of installing grounding stud 74 in panel 48. Because of this unpredictability, some grounding studs 74 will be forced into a mating panel deeper than preferred (this is commonly known as an over-hit condition) and alternatively, in some instances, grounding stud 74 will not be driven into the mating panel to the extent that it should be (this is commonly termed as an under-hit condition). Grounding stud 74 of the present invention is particularly well suited to accommodate under-hit and over-hit conditions in that in the event of an over-hit condition, panel metal is driven into pockets 78 thereby giving stud 74 excellent torque resistance while also providing similar panel penetration features associated with first barbed elements 44 (as disclosed in conjunction with FIGS. 1–7) thereby allowing stud 74 to function adequately as an electrical grounding stud. On the other hand, when ground stud 74 experiences an under-hit condition upon installation (while pockets 78 may experience little to no panel metal contact) raised barbed elements 44 will penetrate into the mating panel surface thereby providing torque resistance and an excellent conductivity interface.

As discussed in conjunction with the grounding stud disclosed in FIGS. 1–7, first barbed elements 44 preferably extend across panel engaging surface 40 and integrally join annular wall 50 of riveting portion 36. When first barbed elements 44 are fashioned in such a manner, cutting edge 80 is formed at the intersection of panel engaging surface 40 and riveting portion 36 providing a cutting edge which scores the surface of the mating panel during installation of fastener 74 providing excellent electrical conductivity between stud 74 and the electrically conductive panel which stud 74 is fastened to.

Lug engaging surface 42 includes surface 82 which is proximate stud portion 34 and surface 84 which is distal stud portion 34. Surface 82 is raised relative to surface 84 thereby creating step surface 86.

Protective cap 76 is adapted to positively engage stud portion 34 and surface 82 of lug engaging surface 42. Cap 76 is fashioned similar to nuts 66, 68 in that it has only one open end (which accepts stud portion 34). End 70 is closed thereby preventing paint, coatings, and the like from contacting stud portion 34 or surface 82. As will be discussed in conjunction with FIGS. 11–14, cap 76 is preferably fastened to stud portion 34 of grounding stud 74 prior to installing assembly 72 in an electrically conductive panel. By installing assembly 72 as a single unit into an electrically conductive panel, the panel can be painted, or otherwise coated before or after installing assembly 72, without adversely effecting the grounding characteristics of grounding stud 74. If assembly 72 is installed on an electrically conductive panel after the panel is painted or otherwise coated, barbed elements 44 and pocket 78 will act, as has already been described, to penetrate any coatings on panel 48 to provide an ample grounding path between stud 74 and panel 48. If assembly 72 is subjected to paint or other contaminants once it is installed in an electrically conductive panel, protective cap 76 will prevent stud portion 34 or surface 82 from being contacted by any contaminants. When it is appropriate to attach a grounding lug to stud portion 34, protective cap 76 is simply removed and discarded and a lug is placed around stud portion 34 (as has already been described) and secured thereto by a nut or other suitable means. In view of the above, it is easily understood, that the second embodiment of the grounding connector of the present invention is well suited for achieving good electrical conductivity between itself and a mating panel while also providing excellent torque resistance regardless of under-hit or over-hit installation conditions.

Now referring to FIGS. 11–14, in the preferred method of installing assembly 72, assembly 72 is placed adjacent panel 48 (see FIG. 11) such that riveting portion 36 of electrical grounding stud 34 is proximate panel 48. As discussed in conjunction with FIG. 2, plunger 54 is attached to the platen of a press or the like which is adapted to develop sufficient force to pierce panel 48 with riveting portion 36 of electrical grounding stud 74. Surface 84 of flange 38 acts as a plunger engaging surface enabling the downward forces exerted by plunger 54 against electrical grounding stud 74 to be directly transferred to grounding stud 74 (and do not pass through cap 76). It would be impractical to transmit the downward force of plunger 54 through cap 76 inasmuch as the preferred materials for cap 76 are plastic and the like. Although plastic or the like is the preferred material (because protective cap 76 is typically discarded at the time an electrically conductive lug is placed on stud portion 34), any other inexpensive, readily removable, substitute may be used such as rubber, various coatings, and the like.

As seen in FIG. 13, cutting edge 80 forms an excellent electrical interface between electrical grounding stud 74 and electrically conductive panel 48 while the combination of barbed elements 44 and pocket 78 form excellent anti-rotation means accommodating both over-hit and under-hit conditions. As previously explained in conjunction with FIG. 3, electrical grounding stud 74 is suited for use both in prepierced panel applications and non-prepierced panel application. When electrical grounding stud 74 is used in non-prepierced panel applications, slug 62, which is severed from panel 48 during installation, can either be discarded or permanently staked within socket 52.

Now referring to FIGS. 15–19, although many different geometries may be used to accomplish superior electrical interface between electrical grounding stud 74 and an electrically conductive panel, the specific location and geometry of cutting surfaces disposed on electrical ground stud 74 are believed to be important. For example, in the alternative embodiments of electrical grounding stud 74 set out in FIGS. 15–17, flange 38 is generally polygonal (see FIG. 17) having arcuate, coved splines 88 superimposed thereon. Splines 88 intersect panel engaging surface 40 and lug engaging surface 42 thereby creating vertices 90 which form excellent cutting geometries to penetrate panel 48 thereby creating excellent electrical conductivity from electrical grounding stud 74 to mating panel 48. Other embodiments of flange 38 include designing flange 38 with an outer surface resembling that of a hypocycloid preferably having eight cusps 92 (see FIG. 18). In the embodiment of grounding stud 74 set out in FIG. 18, cusps 92 function similarly to that of vertices 90.

Still, in an alternative embodiment, FIG. 19 shows flange 38 being generally polygonal having a plurality of arcuate raised surfaces 94 superimposed thereon. It is fully contemplated that geometries other than those shown in FIGS. 3, 9, and 15–19 are also suitable for providing excellent electrical conductivity between assemblies using electrical grounding stud 74 and mating panel 48.

Now referring to FIG. 20, in a preferred embodiment, protective nut 96 also functions as a means for translating the downward force of plunger 54 to the electrical grounding stud during the installation process. As can be seen from FIG. 20, unlike the embodiment of nut 76 set out in FIG. 8, if nut 96 is comprised of metal or the like, it can be designed with sufficient strength to withstand the downward force exerted against it by plunger 54 during the installation process. By designing nut 96 from metal, or other similar materials, several advantages are gained. Firstly, the radius of flange 38 can be reduced (over that disclosed in conjunction with the embodiment of electrical grounding stud shown in FIGS. 8–14). This is possible because plunger engaging surface 84 is not needed and therefore can be eliminated. This, of course, results directly in a cost saving due to reduced materials and also results in a weight reduction per unit electrical grounding stud. As can be seen from FIG. 20, plunger 54 acts directly against external surface 71 of closed end 70 of nut 96. The force is translated through nut 96 causing electrical grounding stud 74 to pierce through panel 48 in the manner which has already been discussed. In order to ensure positive engagement between plunger 54 and external surface 71, plunger 54 is designed having gap 100.

In an alternative approach, plunger 54 is adapted to bear upon engaging surface 84 of nut 96 thereby transferring a downward force against electrical grounding stud 74 through lug engaging surface 42. In order to ensure positive contact between plunger 54 and engaging surface 84, plunger 54 is designed having gap 100.

In addition to the reduction in weight and cost associated with eliminating plunger engaging surface 84 from flange 38, an additional benefit is realized when nut 96 is constructed from metal. This additional benefit arises because nut 96 can, in addition to providing the protective function which has already been discussed in conjunction with protective cap 76, be used as the means for securing an electrical grounding lug to lug engaging surface 42 of electrical grounding stud 74. For example, once electrical grounding stud 74 is fastened to electrically conductive panel 48, metal nut 96 unthreaded (or otherwise removed) from stud portion 34 and an electrical grounding lug is placed against lug engaging surface 42 of electrical grounding stud 74. Then, metal nut 96 is drawn against the electrical lug such that a secure electrical contact is made between the grounding lug and lug engaging surface 42. This approach has the obvious advantage over constructing the nut from plastic in that the plastic nuts are simply disposed of after they provide their protective function and must be replaced by a metal nut to perform the function of securing a grounding lug to the electrical grounding stud. In a high production setting, the discarded plastic nuts must be collected and disposed of in an orderly fashion in order to eliminate potential safety hazards and other problems associated with improperly discarded nuts. The metal nut disclosed in FIGS. 20 and 21 eliminates this problem inasmuch as the metal nut services to both protect stud portion 34 from contaminants while also serving the utilitarian function of securing an electrical grounding lug against lug engaging surface 42 of electrical grounding stud 74.

FIGS. 22 to 26 are further views of an alternative form of an electrical grounding connector, which is a preferred embodiment. This embodiment is provided with a preferably metallic nut member forming a cap 76 which is used not only to positively engage and protect the stud portion from paint, underseal or other such compounds, but also to fit the piercing and riveting stud member 30 to a panel member 48 in a manner similar to that described above with reference to FIGS. 20 and 21, but with certain detail differences in the method as will be later described in more detail. In principle the grounding stud 30 of FIG. 22 resembles closely the grounding stud of FIG. 8 and it is provided with the same barbs 44 and pockets 78 at its panel engaging surface 40.

The flange 32 also has an end face 42 adjacent the stud portion 34 but in this embodiment the end face is a simple flat radial surface, i.e. it does not have the raised portion 82 of the stud of FIG. 8. The other detailed difference of the stud member 30 of FIG. 22 which is worthy of mention is the reduced diameter end portion 110 which merges via a conical surface 112 into the body of the stud portion. In the completed device this reduced diameter end portion 110 allows an electrical connection lug to be readily fitted over the end of the stud, and can also facilitate handling of the stud member and the assembly during manufacture.

The female nut member 76 forming the cap is of a special design, arising in part from the method of fitting which will now be outlined before considering the detail of the female nut member.

As can be seen from FIGS. 22 and 23, and also partly from FIG. 26, the end portion 110 of the grounding stud 30 projects upwardly through the female nut member 76 and the assembly comprising the grounding stud and the nut member is fitted into a panel by means of a plunger 54. The plunger 54 has a working surface 130 which engages the annular end face 71 of the female nut member 76 and presses the opposite end face 114 thereof against the flange end face 42 to drive the piercing and riveting portion 36 of the grounding stud 30 through the panel 48 into the semi-toroidal die cavity 116 of die member or die insert 56.

It will be noted that after the fitting of the grounding connector assembly to the panel 48, the lower face 118 of the plunger 54 is preferably spaced from the surface of the panel by a distance x (FIG. 23) which also corresponds to the distance between the end face 42 of the grounding stud 30 and the top surface of the panel. In this way the plunger 54 is prevented from contacting the top surface of the panel 48 itself and from damaging the same—even if the panel is pre-painted. Moreover, the surface 42 of the flange of the stud member stands above of the top surface of the panel and ensures that after loosening or removal of the female nut member 76 the electrical connecting lug fitted under the nut and over the stud electrically contacts the grounding stud rather than the panel (where only a faulty contact might arise) and also does not damage any paint applied to the panel.

Several details of the female nut member are worthy of particular mention.

The grounding connector assembly shown here is in particular distinguished from the grounding connector assembly which have been previously illustrated and disclosed in that the screwed on female nut element 76 is open upwardly (as already mentioned), i.e. so that the shaft of the screw portion of the stud projects out of the screwed on nut element. In addition the nut element 76 is provided with a clamping portion 120 in the form, in this embodiment, of a generally cylindrical collar which has at least one and preferably a plurality of equally angularly disposed radial recesses 122 which have been mechanically deformed inwardly to grip slightly on the threaded portion of the stud. This has the particular advantage that the assembly can be put together at the time of manufacture so that the surface 114 contacts the surface 42 and so that this relative position is not lost in subsequent transport and handling. There is also no danger of the nut becoming separated from the grounding stud and being lost, which would be inconvenient and could cause damage in an automatic handling system, or in the press.

Moreover, it will be noted from the detail of FIG. 24 that the end face 42 of the flange 32 is essentially a radial surface perpendicular to the longitudinal axis of the grounding stud, whereas the end face 114 of the female nut member 76 confronting the end face 42 is a very shallow cone surface which converges radially inwardly and upwardly and thus results in an annular line contact between the surface 114 and the surface 42 at the position indicated by the reference numeral 124 in FIG. 24. This contact at this position ensures that paint, underseal etc. is reliably kept away from the surface 42 so that it cannot impair electrical grounding at this position. That is to say a sealing occurs between the shoulder of the stud member and the circular ring surface of the nut due to the circular line contact between the shoulder edge of the stud member and the end surface of the nut member. Good seal is ensured by the high surface pressure caused by the tightening torque with which the two elements are screwed together and it is this that guarantees the paint seal contact.

The detail of FIG. 25 shows the end face 71 of the nut member on which the working surface 130 of the plunger 54 acts during the piercing and riveting procedure. In addition FIG. 25 shows the clearance 126 which takes the form of a narrow air gap and which is expediently provided between the outer diameter of the threaded shaft of the stud member 30 and the upper part 127 of the nut element 76 which can be regarded as a sleeve portion of the nut. The threaded portion 128 of the female nut member 76 is restricted to a few complete turns of the thread and these thread turns engage threaded stud portion 34 of the grounding stud 30 at a portion intermediate the sleeve portion 127 and the end face 114. The reason for this is to ensure that the force which acts on the female nut member during the piercing and riveting operations, and which is transferred to the nut member via the end face 71, does not lead to extensive contact between the female nut member and the stud. Without the air gap the insertion force which exerts a generally compressive action on the nut element could lead to impermissible clamping effects between the nut and the thread of the stud which would hinder the later release of the nut element necessary for the fitting of the electrical connection lug. Indeed substantial deformation or clamping action could result in destruction of the thread element during removal of the nut.

The gap 126 is in any case dimensioned to be sufficiently small so that it provides a sufficient protection for the threaded portion 34 of the grounding stud 30, and so that excessive quantities of paint or underseal are unlikely to penetrate into the gap 126. In any case the preassembled nut will tend to remove such depositions, if any, on being unscrewed to permit fitment of the electrical connection lug. Thus the nut exerts a type of cleaning action on the thread above it. The actual threads 128 themselves prevent any paint or underseal reaching the electrical contact surface 42 of the flange 32 of the grounding stud 30. Such depositions will not affect the electrical conductivity and could indeed assist the self-locking action of the nut on retightening the same. A slight intentional thread deformation produced during filling of the grounding assembly would be used to produce the same effect, or to supplement the locking at the collar portion 120.

Finally, it will be noted that the sleeve portion 127 of the female nut member 76 is preferably formed as a hexagonal driving member so that the nut is tightened and released by way of torque applied to this hexagonal portion. The spacing of this portion above the collar portion has the particular advantage that thick electrical cables attached by a lug to the grounding stud do not hinder the application of a driving tool to the hexagonal portion.

Having described the preferred embodiment of the grounding connector, grounding connector assembly, and the preferred methods of attaching the grounding connector and grounding connector assembly to an electrically conductive panel, it will be understood that various modifications or additions may be made to the preferred embodiments chosen here to illustrate the present invention, without departing from the spirit of the present invention. For example, the relative dimensions of the grounding connectors and associated nuts herein disclosed will depend largely upon the particular application at hand and the selected panel thicknesses. As has been herein described, the grounding connector and grounding connector assembly is particularly suited for attachment to electrically conductive panels such as utilized for body and structural components in the automotive and appliance industries. As will be understood by those skilled in the art, the connector assembly of the present invention is preferably formed of plastically deformable metal, preferably steel, which may be heat treated for surface hardness, ductility, and other desirable features. A suitable material for the fasteners herein disclosed is medium carbon steel suitable for cold forming, including SAE 1022, 1023, and 1030 steels. Excellent results have been achieved with steels in the range of SAE 1020 through SAE 1040. Reference also may be made to the earlier cited patents for further information regarding suitable installation, apparatus, self-piercing and riveting fasteners and methods of installing same. Accordingly, it is typically understood that the subject matter sought to be afforded protection hereby shall be deemed to extend to the subject matter defined in the appended claims, including all fair equivalents thereof.

We claim:

1. An electrical grounding connector assembly for attachment to a panel, said assembly including a stud fastener having a riveting portion for riveting attachment to said panel, a body portion having a flange extending radially therefrom and a threaded stud portion extending generally perpendicular to said radial flange portion, and said assembly including a nut member having a threaded bore threadably received on said threaded stud portion, said radial flange having an annular bearing surface surrounding said stud portion for receiving an annular electrical connector, and said nut having an opposed annular bearing surface, said annular bearing surfaces converging radially to a generally circular line contact between said bearing surfaces spaced from said stud portion, said line contact sealing said annular bearing surfaces and preventing entry of paint, undercoating and other debris from entering the space between said bearing surfaces when said stud fastener is riveted to said panel and said nut member is threadably received on said stud portion.

2. The electrical grounding connector assembly of claim 1, wherein said annular bearing surface of said nut member is conical, extending radially towards said stud flange annular bearing surface providing a circular line contact adjacent an outer surface of said flange portion.

3. The electrical grounding connector assembly of claim 1, wherein said nut member has an open end, said stud portion extending through said open end and said nut member having an annular drive surface surrounding said open end for receiving a drive member driving said riveting portion of said stud member into riveting engagement with said panel when said nut is threadably received on said stud portion.

4. The electrical grounding connector of claim 3, wherein said nut member bore is threaded adjacent said annular bearing surface through at least a plurality of threads, and said nut member bore having an unthreaded portion adjacent said annular drive surface defining a clearance between said nut member bore and said stud portion adjacent said drive surface, said clearance limiting transmission of forces to said threaded bore from said drive surface.

5. An electrical grounding connector assembly for attachment to a conductive panel, said assembly including a metal stud member having a riveting portion for attachment to said panel, a body portion having a flange portion extending radially therefrom and a threaded stud portion extending generally perpendicular to said radial flange portion, and said assembly including a nut member having a bore threadably received on said threaded stud portion, said radial flange having an annular bearing surface surrounding said stud portion for receiving an electrical connector and said nut having an opposed annular bearing surface, said nut member having an open end and said stud portion extending through said bore open end, said nut member having an annular drive surface surrounding said open end for receiving a drive member for driving said riveting portion of said stud member into riveting engagement with said panel when said nut member is threaded on said stud member, said nut member bore threaded adjacent said annular bearing surface through at least a plurality of female threads, and said nut member bore having an unthreaded portion adjacent said drive surface and said unthreaded portion defining a clearance between said stud portion adjacent said drive surface and said nut member bore, said clearance limiting transmission of drive forces from said annular drive surface of said nut member to said threaded stud portion when said stud fastener is driven toward said panel.

6. The electrical grounding connector assembly defined in claim 5, wherein said annular bearing surfaces of said nut and stud members converge radially to provide a generally circular line contact between said annular bearing surfaces spaced from said stud portion, said circular line contact sealing said annular bearing surfaces and preventing entry of paint, undercoating and other debris from entering the space between said bearing surfaces when said stud member is riveted to said panel and said nut is threaded on said stud portion.

7. The electrical grounding connector assembly of claim 5, wherein said annular bearing surface of said nut is conical, extending radially from the axis of said stud toward said stud member flange portion annular bearing surface to define a circular line contact between said bearing surfaces adjacent an outside surface of said flange portion.

8. The electrical grounding connector assembly of claim 5, wherein an outside surface of said nut member is deformed radially inwardly opposite said threaded bore to form an interference fit between said threads of said nut member and said stud portion.

9. An electrical grounding connector assembly for attachment to a conductive panel, said assembly including a conductive metal stud fastener having a body portion including a connector portion for attachment to said panel, a flange portion extending radially from said body portion and a generally cylindrical stud portion extending generally perpendicular from said flange portion, said electrical grounding connector assembly further including a nut member having an axial bore and said stud portion of said stud fastener received in said nut member bore interconnecting said stud fastener and said nut member, said annular flange portion of said stud fastener having a generally flat annular bearing surface surrounding said stud portion for receipt of an annular electrical connector and said nut member having an opposed annular bearing surface inclined radially from said bore toward said flange portion annular bearing surface to define a generally circular line contact between said bearing surfaces spaced radially from said stud portion, said line contact sealing said annular bearing surfaces and preventing entry of paint, undercoating and other debris from a space between said beating surfaces when said connector portion of said stud fastener is connected to said panel and said nut member is received on said fastener stud portion.

10. The electrical grounding connector assembly of claim 9, wherein said nut member bore is internally threaded and said stud portion is externally threaded into said nut member bore having an end portion extending through said nut member bore, and said nut member having an annular drive surface surrounding said stud member end portion for receiving a drive member for driving said connector portion of said stud fastener against said panel.

11. The electrical grounding connector assembly of claim 9, wherein said connector portion of said stud fastener comprises a tubular riveting portion having a free open-end.

12. The electrical grounding connector assembly defined in claim 9, wherein said stud portion is externally threaded and nut member bore is internally threaded adjacent said annular bearing surface through at least a plurality of threads, and said nut member bore having an unthreaded portion adjacent said annular drive surface having a diameter greater than said stud portion defining a clearance between said nut member bore and said externally threaded stud portion adjacent said annular drive surface, said clearance limiting transmission of forces from said nut member to said stud portion of said stud fastener.

13. An electrical grounding connector assembly for attachment to a conductive panel, said assembly including a conductive metal stud member having a connector portion for attachment to said panel in electrical contact with said panel, a body portion having a flange portion extending radially from said body portion and an externally threaded stud portion extending generally perpendicular to said radial flange portion, and said assembly including a nut member having a bore internally threaded and threadably receiving said threaded stud portion, said radial flange portion having an annular bearing surface surrounding said stud portion for receiving an electrical connector and said nut having an opposed annular bearing surface, said bore extending through said nut member to define an open end when said stud portion is threaded in said bore and said stud portion having a free end extending through said nut bore open end, said nut member having an annular drive surface adjacent said bore open end for receiving a drive member for driving said connector portion of said stud member into engagement with said panel when said nut member is threaded on said stud member, said nut member bore threaded generally adjacent said annular bearing surface through at least a plurality of female threads, and said nut member having an unthreaded portion adjacent said drive surface having a diameter greater than said stud portion defining a clearance between said stud portion adjacent said drive surface and said nut member bore, said clearance limiting transmission of drive forces from said annular drive surface of said nut member to said threaded stud portion when said fastener is driven against said panel.

14. The electrical grounding connector assembly defined in claim 13, wherein said annular bearing surfaces of said nut and stud members converge radially from their respective axes to provide a generally circular line contact between said annular bearing surfaces spaced from said stud portion, said circular line contact sealing said annular bearing surfaces and preventing entry of paint, undercoating and other debris from entering a space between said bearing surfaces when said stud member is attached to said panel and said nut is threaded on said stud portion.

15. The electrical grounding connector assembly of claim 14, wherein said annular bearing surface of said nut is conical, extending radially from the axis of said bore toward said stud member flange portion annular beating surface to define said circular contact between said bearing surfaces adjacent an outside surface of said flange portion.

16. The electrical grounding connector assembly of claim 13, wherein an outside surface of said nut member is deformed radially inwardly opposite said threaded bore to form an interference fit between said threads of said nut member and said stud portion.

17. The electrical grounding connector assembly of claim 13, wherein said connector portion of said stud member comprises a tubular riveting portion having a free open end spaced from said radial flange portion.

* * * * *